United States Patent [19]
Hyuga

[11] Patent Number: 5,657,341
[45] Date of Patent: Aug. 12, 1997

[54] SINGLE LONGITUDINAL MODE LASER

[75] Inventor: Hiroaki Hyuga, Kanagawa-ken, Japan

[73] Assignee: Fuji Photo Film Co., Ltd., Kanagawa, Japan

[21] Appl. No.: 578,951

[22] Filed: Dec. 27, 1995

[30] Foreign Application Priority Data

Dec. 27, 1994 [JP] Japan .................. 6-326246

[51] Int. Cl.⁶ .......................... H01S 3/098
[52] U.S. Cl. ................ 372/98; 372/18; 372/19
[58] Field of Search .................. 372/18, 19, 39, 372/92, 98, 99, 108

[56] References Cited

U.S. PATENT DOCUMENTS

| | | | |
|---|---|---|---|
| 5,042,040 | 8/1991 | Harvey et al. | 372/18 |
| 5,278,851 | 1/1994 | Goto | 372/19 |
| 5,506,860 | 4/1996 | Hyuga et al. | 372/98 |

*Primary Examiner*—John D. Lee
*Attorney, Agent, or Firm*—Sughrue, Mion, Zinn, Macpeak & Seas

[57] ABSTRACT

A single longitudinal mode Nd:YAG laser oscillates in the range around 0.9 μm and its oscillation mode is brought to a single longitudinal mode by an etalon disposed in a resonator. The thickness, reflectivity and inclination of the etalon and the separation of the resonator longitudinal modes are adjusted to meet conditions, $$0.6\% \leq R_N \leq 3\%,\ 0.2° \leq \theta \leq 1°$$

wherein $R_N$ represents the effective reflectivity of the etalon at a wavelength $\lambda = \lambda_0 \pm \Delta\lambda c$ deviated from the resonance wavelength $\lambda_0$ of the etalon by the separation $\Delta\lambda c$ of the resonator longitudinal modes and $\theta$ represents the inclination of the optical axis of the etalon to the optical axis of the resonator.

2 Claims, 4 Drawing Sheets

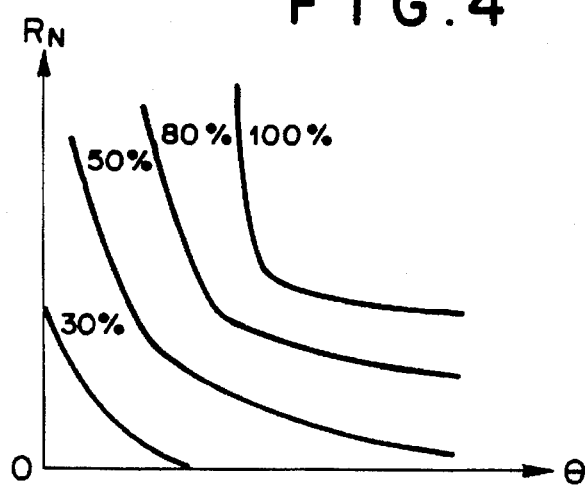
F I G. 4
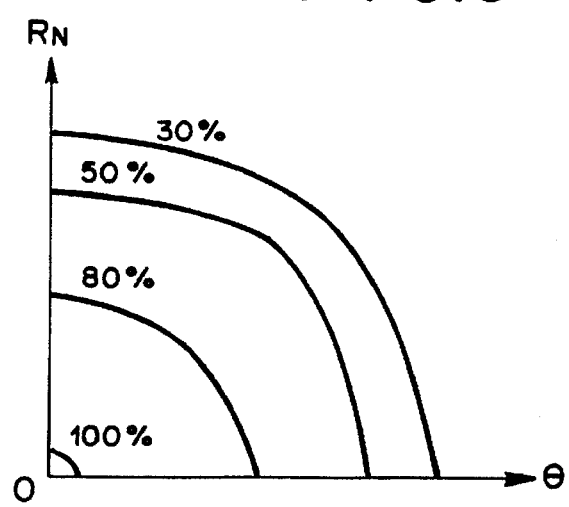
F I G. 5
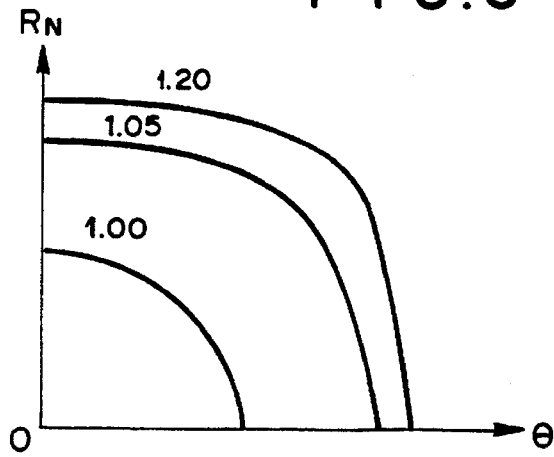
F I G. 6

SINGLE LONGITUDINAL MODE LASER

BACKGROUND OF THE INVENTION

1. Field of the Invention

This invention relates to a Nd:YAG laser, and more particularly to a laser whose oscillation mode is brought to a single longitudinal mode by an etalon disposed in a resonator.

2. Description of the Related Art

There have been provided various solid state lasers where oscillation of Nd:YAG (neodymium-doped YAG) in the range around 0–9 μm is utilized. As disclosed, for instance, in U.S. Pat. No. 5,278,851 and U.S. Pat. Nos. 5,502,738 and 5,506,860, in such lasers, there has been in wide use a technique that a Fabry-Perot etalon is provided in a resonator to bring the oscillation mode to a single longitudinal mode. In this specification, the word "etalon" generally means the Fabry-Perot etalon.

However in the conventional Nd:YAG lasers, where emission in a single longitudinal mode is obtained by use of such an etalon, conditions of the etalon (e.g., thickness, reflectivity and inclination of the etalon) and the resonator (the separation of longitudinal modes) necessary for obtaining a good single longitudinal mode are not known. Accordingly, there has been a problem that when an etalon which has been successful in a certain resonator is used in another resonator as it is, there can be obtained only unsatisfactory single longitudinal mode.

Further, even if an excellent single longitudinal mode can be obtained by virtue of the etalon, it sometimes results in deterioration in the beam profile and/or the output power. Thus the conditions of the etalon and the resonator which must be met in order to obtain a good single longitudinal mode, a good beam profile and a high output power at one time have not been known.

Our investigation has revealed that when the thickness, reflectivity and inclination of the etalon are increased, the beam profile and the output power deteriorate though the single longitudinal mode can be improved and that when the thickness, reflectivity and inclination of the etalon are reduced, properties of the single longitudinal mode deteriorate though the beam profile and the output power can be improved.

When the length of the resonator is increased (that is, when the separation of longitudinal modes in the resonator is reduced), properties of the single longitudinal mode deteriorate and vice versa. However the beam profile and the output power are little affected by the length of the resonator.

SUMMARY OF THE INVENTION

In view of the foregoing observations and description, the primary object of the present invention is to provide a single longitudinal mode laser which is excellent in all of the properties of the single longitudinal mode, the beam profile and the output power.

In accordance with the present invention, there is provided a single longitudinal mode laser in which oscillation of Nd:YAG in the range around 0.9 μm is used and the oscillation mode is brought to a single longitudinal mode by an etalon disposed in the resonator and which is characterized in that the thickness, reflectivity and inclination of the etalon and the separation of the resonator longitudinal modes are adjusted to meet conditions, $$0.6\% \leq R_N \leq 3\%, \quad 0.2° \leq \theta \leq 1°$$

wherein $R_N$ represents the effective reflectivity of the etalon at a wavelength $\lambda=\lambda_0 \pm \Delta\lambda c$ deviated from the resonance wavelength $\lambda_0$ of the etalon by the separation $\Delta\lambda c$ of the resonator longitudinal modes and $\theta$ represents the inclination of the optical axis of the etalon to the optical axis of the resonator.

Preferably the thickness, reflectivity and inclination of the etalon and the separation of the longitudinal modes in the resonator are adjusted to meet conditions, $$0.8\% \leq R_N \leq 2\%, \quad 0.4° \leq \theta \leq 0.8°$$

The Fabry-Perot etalon is a wavelength selector which uses a multiple-beam interference and the effective reflectivity $R_{\mathit{eff}}$ of the Fabry-Perot etalon changes with wavelength as shown by curve a in FIG. 3. As can be seen from FIG. 3, the effective reflectivity $R_{\mathit{eff}}$ of the Fabry-Perot etalon periodically changes, and there exists an etalon longitudinal mode at each wavelength where $R_{\mathit{eff}}=0$, which appears at wavelength intervals of $\Delta\lambda e$ (FSR:Free Spectral Range).

Curve b in FIG. 3 shows the gain spectrum of Nd:YAG. Generally there exist a plurality of resonator longitudinal modes within a wavelength width W where a laser oscillation can occur in the gain spectrum. Accordingly, when an etalon is not used, the laser will oscillate in a multiple longitudinal mode. On the contrast, when an etalon is inserted into the resonator, loss which each resonator longitudinal mode experiences is modulated by the effective reflectivity $R_{\mathit{eff}}$ of the etalon and only one of the resonator longitudinal modes within wavelength width W that experiences the least loss oscillates.

In this manner, a single longitudinal mode can be obtained by use of an etalon. However, conventionally, it has not been known how the loss modulation by the effective reflectivity $R_{\mathit{eff}}$ of the etalon and the inclination of the etalon are to be adjusted in order to obtain a good and stable single longitudinal mode, a good beam profile and a high output power at one time.

Our investigation has revealed that the aforesaid three requirements can be all satisfied when the effective reflectivity $R_N$ (FIG. 3) of the etalon at a wavelength $\lambda=\lambda_0 \pm \Delta\lambda c$ deviated from the resonance wavelength $\lambda_0$ of the etalon by the separation $\Delta\lambda c$ of the resonator longitudinal modes is within a certain range, thereby providing an appropriate loss modulation, and the inclination $\theta$ of the etalon is within a certain range. The range of the effective reflectivity $R_{\mathit{eff}}$ of the etalon and the range of the inclination of the optical axis of the etalon are $0.6\% \leq R_N \leq 3\%$ (preferably, $0.8\% \leq R_N \leq 2\%$) and $0.2° \leq \theta \leq 1°$ (preferably, $0.4° \leq \theta \leq 0.8°$), respectively, as described above.

The effective reflectivity $R_{\mathit{eff}}$ of the etalon is obtained in the following manner. Generally the effective reflectivity $R_{\mathit{eff}}$ is as follows according to Airy's formulae).

$$R_{\mathit{eff}} = \frac{F \sin^2(\delta/2)}{1 + F \sin^2(\delta/2)} \quad (1)$$

$$F = \frac{4R}{(1-R)^2}$$

$$\delta = \frac{4\pi n_e l_e}{\lambda}$$

wherein R represents the reflectivity of the coating of the etalon, $n_e$ represents the refractive index of the etalon, $l_e$ represents the thickness of the etalon and $\lambda$ represents the wavelength of light.

The longitudinal mode separation $\Delta\lambda e$ of the etalon for the oscillation wavelength $\lambda_0$ is as follows.

$$\Delta\lambda e = \lambda_0^2/(2n_e l_e) \tag{2}$$

The resonator longitudinal mode separation $\Delta\lambda c$ is obtained next. Assuming that media (inclusive of air) whose refractive indexes are $n_1, n_2, n_3, n_4, \ldots$ and whose thicknesses are $l_1, l_2, l_3, l_4, \ldots$ are arranged in the resonator, the optical length of the resonator $L_{opt}$ is $$L_{opt} = \sum_i n_i l_i \tag{3}$$

and the resonator longitudinal mode separation $\Delta\lambda c$ is $$\Delta\lambda c = \lambda_0^2/2L_{opt} \tag{4}$$

From formulae (1), (2) and (4), the effective reflectivity $R_N$ of the etalon at a wavelength $\lambda = \lambda_0 \pm \Delta\lambda c$ deviated from the resonance wavelength $\lambda_0$ of the etalon by the separation $\Delta\lambda c$ of the resonator longitudinal modes is as follows partly with approximation.

$$R_N = \frac{F\sin^2(\delta_N/2)}{1 + F\sin^2(\delta_N/2)} \tag{5}$$

$$\delta_N = \frac{\Delta\lambda c}{\Delta\lambda e} \times 2\pi$$

The grounds on which the ranges for the effective reflectivity $R_N$ of the etalon and the inclination $\theta$ of the optical axis of the etalon are determined will be described in detail, hereinbelow.

(a) Single Longitudinal Mode Properties

In a Nd:YAG laser whether the oscillation mode is brought to a single longitudinal mode by a Fabry-Perot etalon, the temperature of the resonator was continuously changed over 10° C. and the proportion of the temperature range where the laser operates in a single longitudinal mode were shown in terms of %. The single longitudinal mode properties were evaluated with the percentage employed as a barometer. The barometer basically changed with the effective reflectivity $R_N$ and the inclination $\theta$ of the etalon as shown in FIG. 4.

(Output Power)

Taking the laser output when an AR (antireflection) coated etalon ($R_N=0$) is inserted in the resonator at about 0° ($\theta \approx 0°$) as 100%, the change in the laser output with change in the effective reflectivity $R_N$ and the inclination $\theta$ of the etalon was investigated with the length of the resonator fixed. The result is shown in FIG. 5.

(c) Beam Quality

When the beam quality is represented in terms of $M^2$, the values basically changes with the effective reflectivity $R_N$ and the inclination $\theta$ of the etalon as shown in FIG. 6 so long as the length of the resonator is fixed.

From the properties shown in FIGS. 4 to 6, the ranges of the effective reflectivity $R_N$ and the inclination $\theta$ of the etalon which can meet given longitudinal mode property requirements, output power requirements and beam quality requirements can be known. For example, relatively light requirements such as single longitudinal mode property $\geq 80\%$ output powers $\geq 30\%$ $M^2 \leq 1.2$ can be met by setting the effective reflectivity $R_N$ and inclination $\theta$ of the etalon to fall within the hatched portion in FIG. 7. That is, $0.6\% \leq R_N \leq 3\%$ and $0.2° \leq \theta \leq 1°$.

Further, relatively severe requirements such as single longitudinal mode property $\geq 100\%$ output power $\geq 50\%$ $M^2 \leq 1.05$ can be met by setting the effective reflectivity $R_N$ and inclination $\theta$ of the etalon to fall within the hatched portion in FIG. 8. That is, $0.8\% \leq R_N \leq 2\%$ and $0.4° \leq \theta \leq 0.8°$.

BRIEF DESCRIPTION OF THE DRAWINGS

FIG. 4 is a graph showing the change in single longitudinal mode property of a Nd:YAG laser with the effective reflectivity $R_N$ and the inclination $\theta$ of the etalon, FIG. 5 is a graph showing the change in the output power of a Nd:YAG laser with the effective reflectivity $R_N$ and the inclination $\theta$ of the etalon, FIG. 6 is a graph showing the change in the beam quality of a Nd:YAG laser with the effective reflectivity $R_N$ and the inclination $\theta$ of the etalon.

DESCRIPTION OF THE PREFERRED EMBODIMENT

Figure 1:
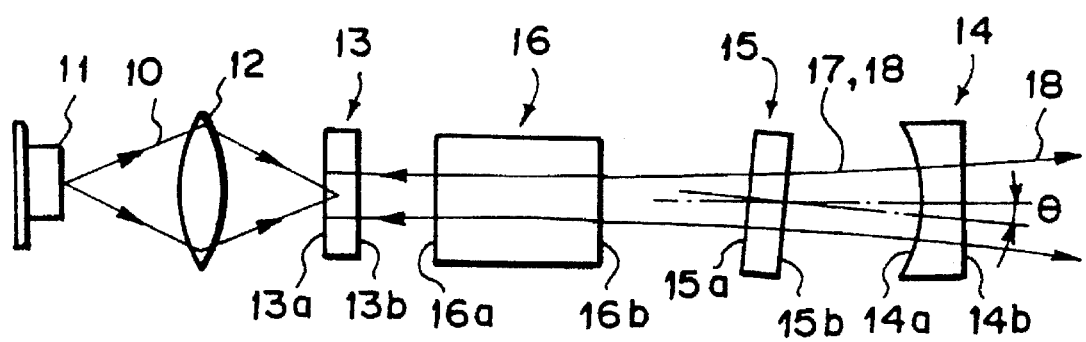
FIG. 1 is side view of a single longitudinal mode laser in accordance with a first embodiment of the present invention.

In FIG. 1, a single longitudinal mode laser in accordance with a first embodiment of the present invention, which may be, for instance, a laser diode pumped solid state laser, comprises a semiconductor laser 11 which produces a laser beam 10 as a pumping beam, a condenser lens 12 which condenses the laser beam 10, which is produced as divergent light, a YAG crystal 13 which is a solid laser medium doped with neodymium (Nd) (will be referred to as "Nd:YAG crystal 13", hereinbelow), a resonator mirror 14 disposed forward (the right side as seen in FIG. 1) of the Nd:YAG crystal 13, an etalon 15 of quartz disposed between the resonator mirror 14 and the Nd:YAG crystal 13 and a KNbO₃ crystal 16, which is a nonlinear optical material, disposed between the resonator mirror 14 and the Nd:YAG crystal 13.

These elements are mounted together with one another on a single casing (not shown). As will be described later, the resonator formed by the Nd:YAG crystal 13 and the resonator mirror 14 and the semiconductor laser 11 are kept at a predetermined temperature by a Peltier element and a temperature control circuit (not shown).

The semiconductor laser 11 produces a laser beam 10 having a wavelength of 809 nm. Neodymium ions in the Nd:YAG crystal 13 are stimulated by the laser beam 10 and the Nd:YAG crystal 13 thereby produces a laser beam 17 having a wavelength of 946.2 nm. The laser beam 17 impinges upon the KNbO₃ crystal 16 and is converted into its second harmonic 18 having a wavelength of 473.1 nm equal to a half of the wavelength of the laser beam 17.

Rear and front end faces 13a and 13b of the Nd:YAG crystal 13, rear and front end faces 16a and 16b of the KNbO$_3$ crystal 16, rear and front end faces 15a and 15b of the etalon 15, and the mirror surface 14a and the light exit side end face 14b of the resonator mirror 14 are provided with coatings so that the reflectivities or transmissivities of these faces to wavelengths of 809 nm, 946.2 nm and 473.1 nm described above and to wavelengths of 1064 nm and 1300 nm of other oscillating lines of the Nd:YAG crystal 13 are as shown in the following table 1. In table 1, R denotes reflectivity and T denotes transmissivity in terms of %.

TABLE 1

| | 13a | 13b | 16a | 16b | 15a | 15b | 14a | 14b |
|---|---|---|---|---|---|---|---|---|
| 809 nm | T ≥ 85 | R ≤ 2 | — | — | — | — | — | — |
| 946.2 nm | R ≥ 99.9 | R ≤ 0.1 | R ≤ 1 | R ≤ 1 | R = 28 | R = 28 | R ≥ 99.9 | R ≤ 0.2 |
| 1064 nm | T ≥ 30 | R ≤ 10 | — | — | — | — | T ≥ 30 | R ≤ 10 |
| 1300 nm | T ≥ 70 | R ≤ 25 | — | — | — | — | T ≥ 70 | R ≤ 25 |
| 473.1 nm | R ≥ 99 | R ≤ 0.5 | R ≤ 0.5 | R ≤ 0.5 | R ≤ 0.5 | R ≤ 0 0.5 | R ≤ 0.5 | |

In the single longitudinal mode laser with the arrangement described above, the laser bean 17 of 946.2 nm resonates between the end face 13a of the Nd:YAG crystal 13 and the mirror surface 14a of the resonator mirror 14 and is brought to a single longitudinal mode by the etalon 15. Accordingly also the second harmonic 18 is brought to a single longitudinal mode, and emanates through the light exit side end face 14b of the resonator mirror 14.

The refractive indexes and thicknesses of the Nd:YAG crystal 13, KNbO$_3$ crystal 16 and the etalon 15 are as follows. The length of the resonator, that is, the distance between the end face 13a of the Nd:YAG crystal 13 and the mirror surface 14a of the resonator mirror 14, is 15 mm.

| | refractive index | thickness |
|---|---|---|
| Nd:YAG crystal 13 | 1.823 | 1 mm |
| KNbO$_3$ crystal 16 | 2.235 | 2 mm |
| ETALON 15 | 1.451 | 0.385 mm |

When the refractive index of air in the resonator is considered to be 1, the optical length of the resonator $L_{opt}$=18.7 mm from the above formula (3) and accordingly the resonator longitudinal mode separation $\Delta\lambda c$=0.024 nm from the above formula (4). Further the etalon longitudinal mode separation $\Delta\lambda e$=0.8 nm from the above formula (2).

Based on the values above, the effective reflectivity $R_N$ of the etalon 15 at the wavelength $\lambda=\lambda_0 \pm \Delta\lambda c$ deviated from the resonance wavelength $\lambda_0$ (=946.2 nm) of the etalon 15 by the separation $\Delta\lambda c$ (0.024 nm) of the resonator longitudinal modes is 1.87% from the above formula (5). The etalon 15 is positioned so that its optical axis is at 0.4° to the optical axis of the resonator ($\theta$=0.4°). Thus in this embodiment, both the conditions 0.6%≤$R_N$≤3% and 0.2°≤$\theta$≤1° are satisfied as well the more preferred conditions 0.8%≤$R_N$≤2% and 0.4°≤$\theta$≤0.8°.

With the single longitudinal mode laser of this embodiment, a second harmonic output 18 of 5 mW in a stable single longitudinal mode was obtained for an output of 300 mW from the semiconductor laser 11. The second harmonic 18 was in a TEM$_{00}$ mode and was in the form of a substantially ideal Gaussian beam.

Figure 2:
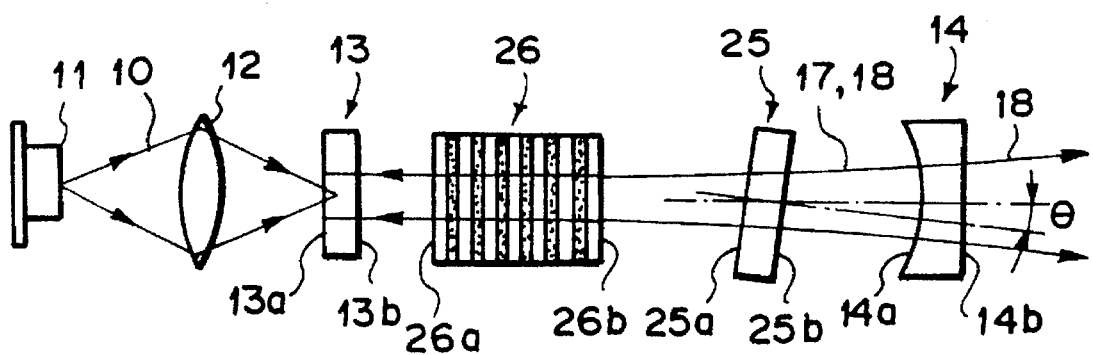
FIG. 2 is side view of a single longitudinal mode laser in accordance with a second embodiment of the present invention.
Figure 3:
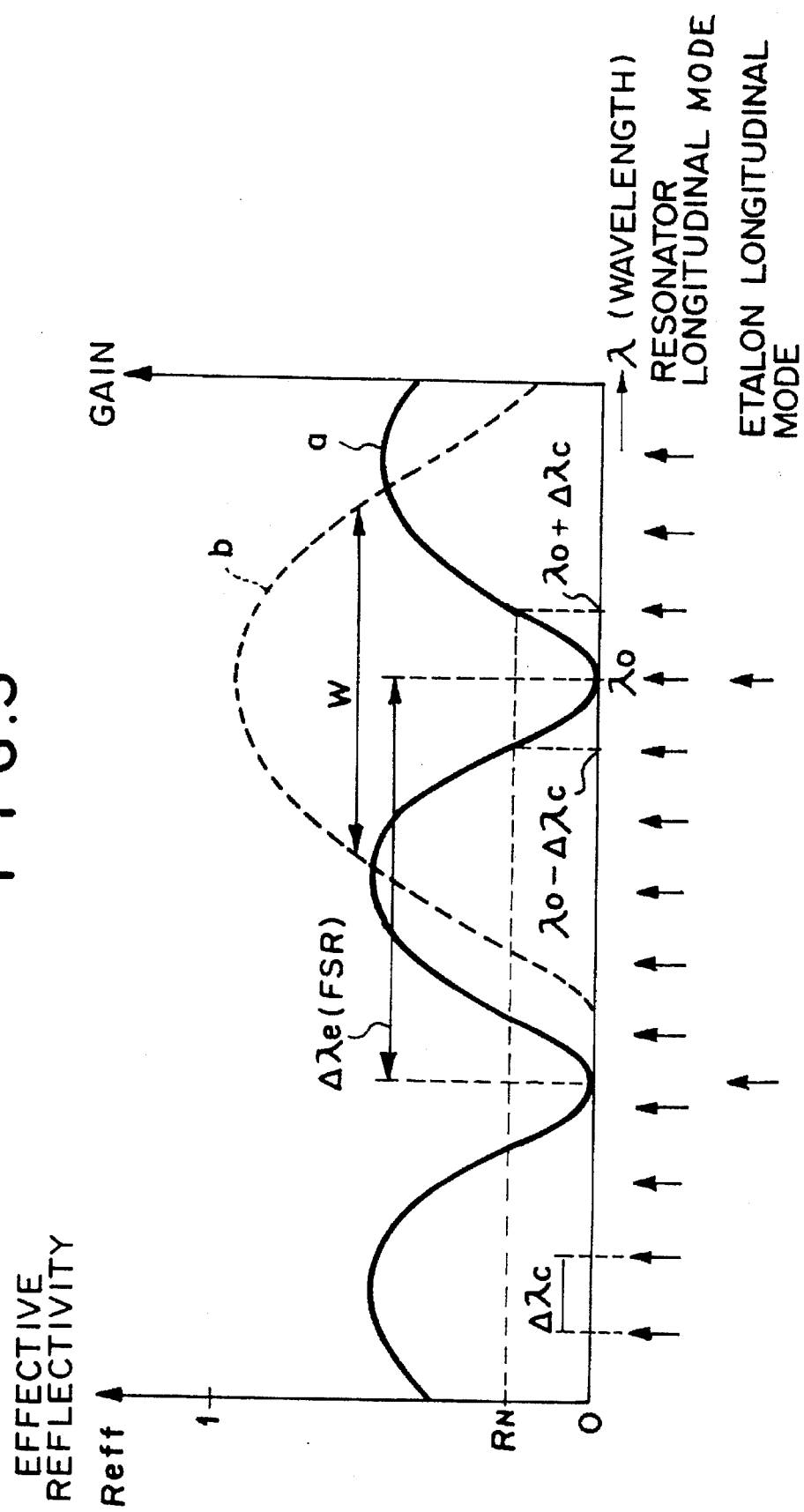
FIG. 3 is a view showing the relation between the effective reflectivity of the etalon and the etalon longitudinal modes and the resonator longitudinal modes.
Figure 7:
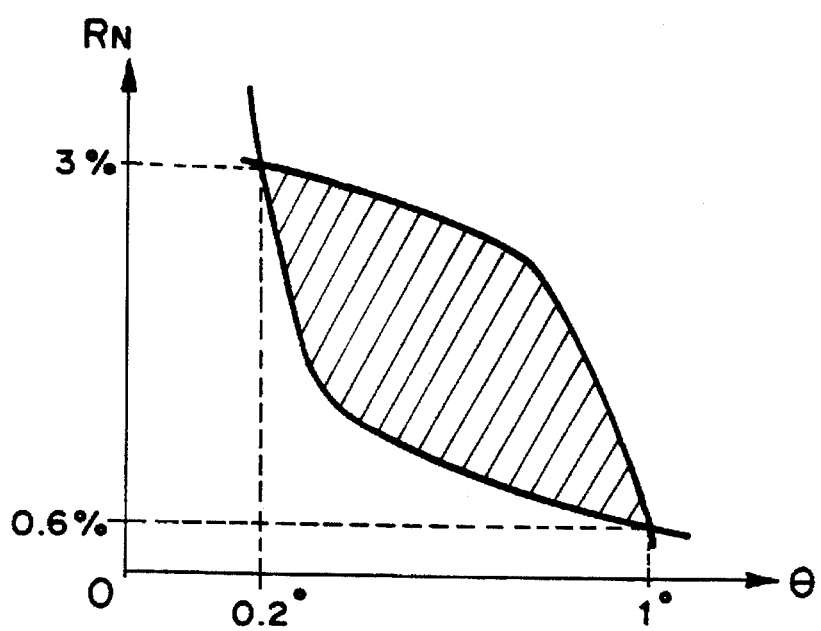
FIG. 7 is a graph showing a preferable range of the effective reflectivity $R_N$ and the inclination $\theta$ of the etalon.
Figure 8:
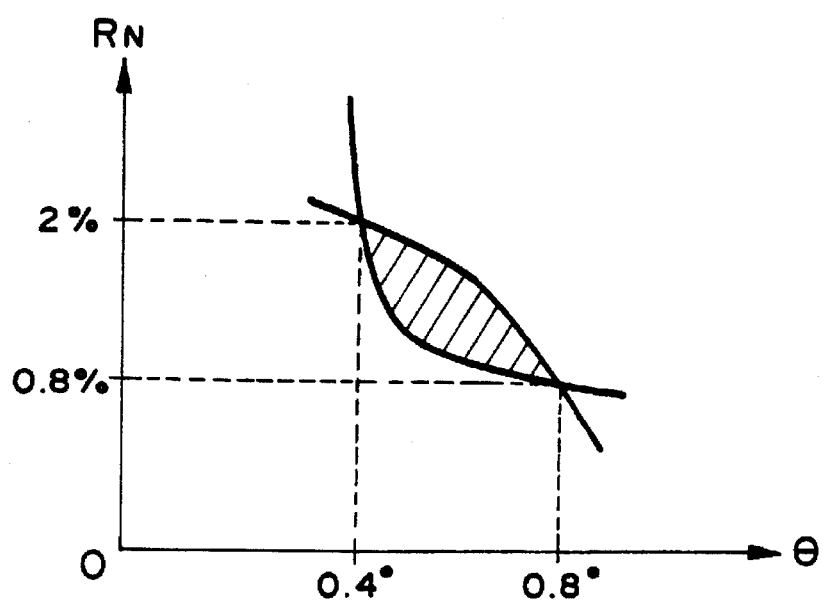
FIG. 8 is a graph showing a more preferable range of the effective reflectivity $R_N$ and the inclination $\theta$ of the etalon.

A second embodiment of the present invention will be described with reference to FIG. 2, hereinbelow. In FIG. 2, the elements analogous to those in FIG. 1 are given the same reference numerals and will not be described here.

The single longitudinal mode laser of the second embodiment differs from that of the first embodiment only in that an etalon 25 of calcite is employed instead of the etalon 15 of quartz and a MgO:LiNbO$_3$ crystal (a LiNbO$_3$ crystal doped with MgO) 26 having a periodic domain inversion structure is employed instead of the KNbO$_3$ crystal 16. Also with this arrangement, a laser beam 17 having a wavelength of 946.2 nm in a single longitudinal mode can be obtained by virtue of the etalon 25. The laser beam 17 is converted into its second harmonic 18 having a wavelength of 473.1 nm equal to a half of the wavelength of the laser beam 17, by the MgO:LiNbO$_3$ crystal 26 which is a nonlinear optical crystal.

The refractive indexes and thicknesses of the Nd:YAG crystal 13, MgO:LiNbO$_3$ crystal 26 and the etalon 25 are as follows. The length of the resonator, that is, the distance between the end face 13a of the Nd:YAG crystal 13 and the mirror surface 14a of the resonator mirror 14, is 10 mm.

| | refractive index | thickness |
|---|---|---|
| Nd:YAG crystal 13 | 1.823 | 1 mm |
| MgO:LiNbO$_3$ crystal 26 | 2.16 | 2 mm |
| ETALON 25 | 1.645 | 0.340 mm |

The optical properties of the coatings on the respective optical elements in the second embodiment are the same as those in the first embodiment except that the optical properties of the coatings on end faces 25a and 25b of the etalon 25 are as follows. (The coatings on the end faces of the MgO:LiNbO$_3$ crystal 26 are the same as those on the KNbO$_3$ crystal 16)

| | 25a | 25b |
|---|---|---|
| 946.2 nm | R = 12 | R = 12 |
| 473.1 nm | R ≤ 0.5 | R ≤ 0.5 |

In the same manner as in the first embodiment, the optical length of the resonator $L_{opt}$=13.6 mm, the resonator longitudinal mode separation $\Delta\lambda c$=0.033 nm and the etalon longitudinal mode separation $\Delta\lambda e$=0.8 nm.

Based on the values above, the effective reflectivity $R_N$ of the etalon 25 at the wavelength $\lambda=\lambda_0 \pm \Delta\lambda c$ deviated from the resonance wavelength $\lambda_0$ (=946.2 nm) of the etalon 15 by the separation $\Delta\lambda c$ (0.033 nm) of the resonator longitudinal modes is 1.02% from the above formula (5). The etalon 25 is positioned so that its optical axis is at 0.6° to the optical axis of the resonator ($\theta$=0.6°). Thus also in this embodiment, both the conditions 0.6%≤$R_N$≤3% and 0.2°≤$\theta$≤1° are satisfied as well the more preferred conditions 0.8%≤$R_N$≤2% and 0.4°≤$\theta$≤0.8°.

With the single longitudinal mode laser of this embodiment, a second harmonic output 18 of 20 mW in a stable single longitudinal mode was obtained for an output of 300 mW from the semiconductor laser 11. The second harmonic 18 was in a TEM$_{00}$ mode and was in the form of a substantially ideal Gaussian beam. Since the MgO:LiNbO$_3$ crystal 26 employed in this embodiment does not have a walk-off effect unlike the KNbO$_3$ crystal employed in the first embodiment, the beam quality is better than in the first embodiment.

In the second embodiment, the etalon 25 is formed calcite which is birefringent and has a polarization control function. By causing the orientation of the linear polarization of the laser beam 17 to coincide with the direction of the c axis of the MgO:LiNbO$_3$ crystal 26 by the etalon 25, the laser beam 17 which is a fundamental wave can be efficiently converted into the second harmonic 18.

What is claimed:

1. A single longitudinal mode laser which uses Nd:YAG as a laser medium and oscillates in the range around 0.9 μm and in which the oscillation mode is brought to a single longitudinal mode by an etalon disposed in a resonator wherein the improvement comprise that the thickness, reflectivity and inclination of the etalon and the separation of the resonator longitudinal modes are adjusted to meet conditions, $$0.6\% \leq R_N \leq 3\%, \ 0.2° \leq \theta \leq 1°$$

where $R_N$ represents the effective reflectivity of the etalon at a wavelength $\lambda = \lambda_0 \pm \Delta\lambda c$ deviated from the resonance wavelength $\lambda_0$ of the etalon by the separation $\Delta\lambda c$ of the resonator longitudinal modes and $\theta$ represents the inclination of the optical axis of the etalon to the optical axis of the resonator.

2. A single longitudinal mode laser as defined in claim 1 in which the thickness, reflectivity and inclination of the etalon and the separation of the longitudinal modes in the resonator are adjusted to meet conditions, $$0.8\% \leq R_N \leq 2\%, \ 0.4° \leq \theta \leq 0.8.$$

* * * * *